United States Patent Office 2,960,691
Patented Nov. 15, 1960

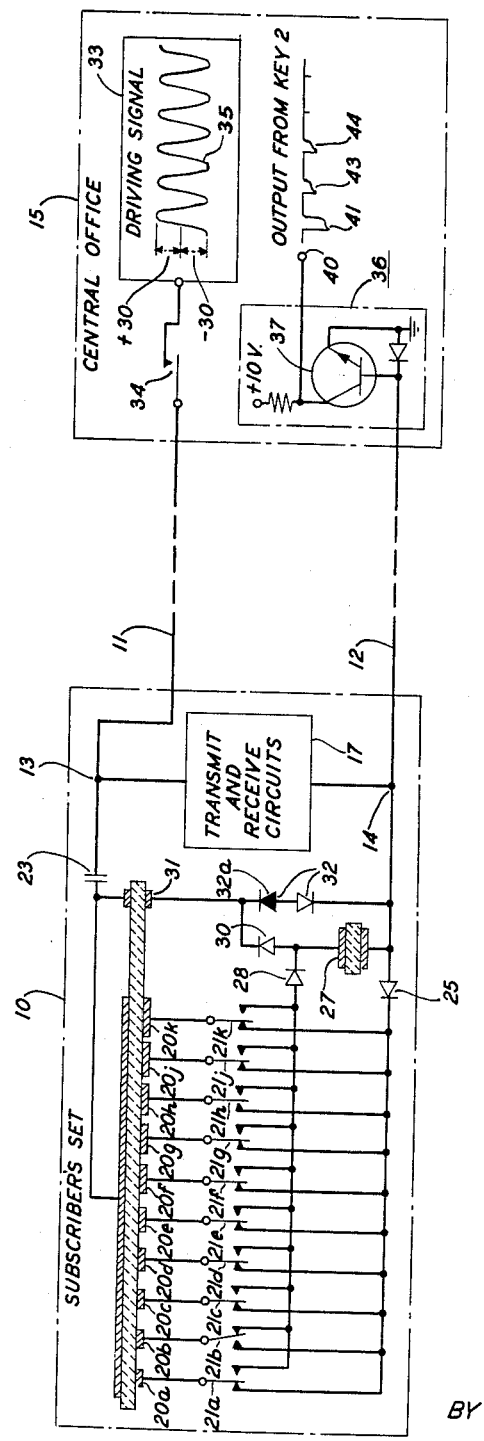

2,960,691

PULSE SIGNALING CIRCUIT

Robert M. Wolfe, Colonia, N.J., assignor to Bell Telephone Laboratories, Incorporated, New York, N.Y., a corporation of New York Filed June 10, 1957, Ser. No. 664,598

7 Claims. (Cl. 340—359)

This invention relates to electrical signaling circuits and more particularly to signaling circuits for transmitting digital pulses.

In application Serial No. 664,600, filed June 10, 1957, of J. R. Anderson, now Patent No. 2,864,079, granted December 9, 1958, there is disclosed a revertive type signaling circuit wherein a plurality of ferroelectric capacitors are connected in parallel between the terminals of the circuit. The ferroelectric capacitors have electrodes of successively increasing area and specifically the electrode areas are successive multiples of the area of the smallest electrode of the first capacitor. A train of pulses is applied to the parallel capacitors, pulses of one polarity in the train serving to set all the capacitors to one state of remanent polarization. Reversal of this state of polarization by the pulses of opposite polarity in the train is prevented by a diode connected between the capacitors and one of the circuit terminals.

When it is desired to transmit a particular number of pulses, a switch or key connects the capacitor corresponding to the desired digit to the terminal of the circuit through a charge-metering ferroelectric capacitor which has electrodes of the same area as the smallest of the parallel or digit-indicating capacitors; thus, we can say the charge-metering capacitor has electrodes of unit area. The circuit is arranged so that successive reversals of the charge-metering capacitor on application of the train of pulses to the series connected digit-indicating capacitor and charge-metering capacitor cause pulses to appear at the circuit terminal for transmittal to distant apparatus or circuitry.

The basic principles of ferroelectric remanent polarization and the reversal of the polarization by means of applied pulses are explained in detail in Patent 2,717,373, issued September 6, 1955, of J. R. Anderson. Further, the principles and operation of reversal of polarization of pairs of serially connected ferroelectric capacitors are set forth in Patent 2,695,396, issued November 23, 1954, of J. R. Anderson. In addition to the basic principles taught by these two patents, the revertive signaling circuit of the above-mentioned Anderson application further utilizes the principles of operation of a serially connected pair of capacitors having different electrode area, as disclosed and described in detail in my application Serial No. 552,459, filed December 12, 1955, now Patent No. 2,854,590, granted September 30, 1958.

Specifically, as set forth in my prior application, when two capacitors of different electrode areas are serially connected across a pulse source, the smaller of the two capacitors acts as a charge-metering capacitor. The number of reversals of the polarization of the smaller capacitor required completely to reverse the polarization of the larger capacitor is a function of the ratio of the electrode areas of the two capacitors. For example, if the area of the electrodes of the larger capacitor is twice as large as the electrode area of the smaller capacitor, two reversals of the smaller capacitor will be required completely to reverse the polarization of the larger capacitor, assuming, of course, that an alternate path is provided to reset the smaller or charge-metering capacitor after each reversal of the smaller capacitor through the larger capacitor.

The electrical signaling circuit of the above-mentioned Anderson application may be employed with a wide variety of switching or keying means for selectively connecting the digit-indicating ferroelectric capacitors in series with the charge-metering capacitor. When utilized in a telephone subscriber's subset, however, the switching is most advantageously accomplished by contacts on push buttons or keys. When such keys are utilized, there is the additional limitation that they should not be subject to contact chatter, as the circuit of the above-mentioned Anderson application is sensitive to any chattering during the make contact which might introduce additional, but erroneous, positive output pulses.

It is a general object of this invention to provide an improved signaling system.

It is a more specific object of this invention to provide an improved signaling system employing ferroelectric capacitors with progressively increasing electrode areas.

It is a further object of this invention to prevent contact chatter from effecting erroneous output pulses in such signaling circuits. Accordingly, it is an object of this invention to enable such signaling circuits to utilize cheaper manual keys with less stringent engineering requirements by removing the sensitivity of the circuit to contact chatter.

Briefly, in accordance with aspects of this invention, a signaling circuit, which may advantageously be a subscriber's push-button key set, of the type disclosed in J. R. Anderson application Serial No. 664,600, filed June 10, 1957, now Patent No. 2,864,079, granted December 9, 1958, is provided with improved circuitry for controlling the transmission of digit-indicating pulses to the central office. This circuitry includes a transfer capacitor having an electrode area equal to the electrode of the largest digit-indicating capacitor. The transfer capacitor is connected through the selecting switches to the digit-indicating ferroelectric capacitors such that the remanent polarization of the transfer capacitor will permit the complete reversal of the remanent polarization of the digit-indicating capacitors in response to a single pulse from the driving pulse source located in the central office. After the digit has been effectively transferred to the transfer capacitor, the transfer capacitor is progressively pulsed through a charge-metering capacitor until the remanent polarization of the transfer capacitor is restored to its initial condition. In response to this stepwise reversal of the polarization of the transfer capacitor, the digit-indicating pulses are transmitted over one side of the subscriber's loop to the pulse-detecting circuit located in the central office.

Accordingly, it is a feature of this invention that an electrical signaling circuit employing digit-indicating ferroelectric capacitors and a plurality of switches for closing circuits through each of these digit-indicating ferroelectric capacitors also comprise a transfer ferroelectric capacitor, which transfer capacitor has an electrode area at least equal to the electrode area of the largest of the digit-indicating ferroelectric capacitors.

It is another feature of this invention to connect a transfer ferroelectric capacitor in an electrical signaling circuit to permit the complete reversal of the remanent polarization of a digit-indicating ferroelectric capacitor through the transfer ferroelectric capacitor in response to a single pulse applied to the signaling circuit.

It is another feature of this invention permanently to connect a transfer capacitor and a charge-metering capacitor in series between the terminals of a signaling circuit to meter digit-indicating pulses from the transfer capacitor in response to the application of a train of pulses at one of the terminals of the circuit.

A complete understanding of this invention and of these and various other features thereof may be gained from consideration of the following detailed description and the accompanying drawing which is a schematic representation of one specific illustrative embodiment of my invention.

Referring now to the drawing, subscriber set 10 is connected at terminals 13 and 14 to wires 11 and 12 which are terminated at central office 15. The subscriber set includes transmit and receive circuit 17 connected between terminals 13 and 14. These transmit and receive circuits may be of any of the convenient type ordinarily employed in common battery exchanges. Ferroelectric capacitors 20a through 20k are connected to terminals 13 and 14 through switches 21a through 21k, capacitor 23, and diode 25. As set forth in the above-identified Anderson application, the electrode areas of capacitors 20a through 20k progressively increase in size and are successive multiples of the unit electrode area of capacitor 20a. The capacitors 20 may be individual capacitors having one electrode of each electrically connected together or may all be defined on a single ferroelectric member, as depicted in the drawing, with one common electrode and individual electrodes opposite that common electrode, in which case the size of the individual electrodes determines the electrode area discussed above.

In accordance with my invention a transfer capacitor 27 is connected to one contact of each of switches 21a through 21k through a diode 28. Transfer capacitor 27 has an electrode area at least as large as capacitor 20k to permit the complete reversal of any of the digit-indicating capacitors through the transfer capacitor in response to a single pulse, as will be subsequently explained. Transfer capacitor 27 is also connected through diode 30 to one electrode of a charge-metering capacitor 31. The other electrode of charge-metering capacitor 31 is connected to the capacitor 23. A double anode Zener diode 32 is connected between one electrode of charge-metering capacitor 31 and terminal 14 to provide a resetting path for the charge-metering ferroelectric capacitor 31, as will be subsequently explained.

The central office 15 includes a source 33 of driving pulses 35, which driving pulses are applied to the digit-indicating capacitors in response to the closing of switches 21a through 21k, as will be subsequently explained. The central office 15 also includes a pulse detector circuit 36 which advantageously includes transistor 37 for detecting the pulses transmitted through the subscriber set. The output terminal 40 of the detector 36 may be connected to suitable circuitry for registering the dialed pulses and selecting the line of the called party, as is known in the art.

When the handset is removed from the subscriber subset, a closed circuit is established between terminals 13 and 14, which closed circuit causes the actuation of circuitry within the central office, such as a relay having contacts 34, to apply driving signals from source 33 to line 11 of the subscriber's loop. The subscriber may now selectively actuate switches 21a through 21k to deliver digit-indicating pulses over line 12 to pulse detector circuit 36. Let us assume for the purpose of explanation of the operation of the subscriber set that the subscriber wishes to transmit the digit "2" to the central office. On the basis of this assumption the subscriber closes switch 21b to its right-hand contact, as indicated in the drawing. The next positive driving pulse from source 33 completely reverses the remanent polarization of capacitor 20b through capacitor 27. As capacitor 27 has a larger electrode area than any of the capacitors 20, the capacitors 20 will always completely reverse their state of polarization on application of the first positive driving pulse across the series connected capacitors 20 and 27. However, the remanent polarization of capacitor 27 will be only partially reversed, the amount of reversal depending on the electrode area of the selected capacitor 20. On the next negative cycle, capacitor 27 will be partially restored to its initial condition of polarization through diode 30 and charge-metering ferroelectric capacitor 31, capacitor 31 limiting the reversal of polarization as its electrode area is only one unit area. On the next succeeding positive pulse, the remanent polarization of charge-metering ferroelectric capacitor 31 will be restored to its initial condition through double anode diode 32, and in response to this reversal of capacitor 31, a pulse will be transmitted over wire 12 and detected by transistor 37, causing an output pulse 44 to appear at terminal 40. In response to the next negative pulse, transfer capacitor 27 is restored to its initial condition of polarization by the transmission of a second metered pulse through transfer capacitor 27, diode 30, and charge-metering capacitor 31. On the next subsequent positive pulse, the remanent polarization of capacitor 31 is again reversed through double anode Zener diode 32, causing an output pulse 43 to be delivered by detecting circuit 36 to its output terminal 40.

When switch 21b is initially moved to its righthand position as indicated on the drawing, the remanent polarization of capacitor 20b is completely reversed through diode 28 and capacitor 27 by the next succeeding positive pulse, as discussed above, causing pulse 41 to be delivered at the output terminal of pulse-detecting circuit 36. Pulse 41 will be N times as large as the individual digit-indicating pulses delivered from charge-metering ferroelectric capacitor 31, N being the particular digit which is to be transmitted. In this particular example, pulse 41 will be twice as large as pulses 43 and 44 since capacitor 20b has an electrode area twice as large as the electrode area of charge-metering ferroelectric capacitor 31.

As disclosed in the Bell System Technical Journal, volume 33, No. 4, July 1954, page 827, silicon junction diodes may exhibit a reverse current saturation characteristic which may be employed to control the flow of current, or in this particular instance, act as a voltage responsive switch. The silicon diode conducts current in a forward direction in the manner of an ordinary diode. When an increasing voltage is applied in the reverse direction, the diode initially presents a high impedance, and practically no current flows through the diode until a saturation voltage is impressed, at which point the reverse current increases rapidly without a further increase in the reverse voltage. This is explained on the basis that when the saturation voltage is reached, the electrons and/or holes which comprise the leakage current are given sufficient energy to create other electron-hole pairs which add to the original reverse current.

In one specific illustrative embodiment wherein all the ferroelectric capacitors had dielectrics of barium titanate of 2 mil thickness, the smallest or unit electrode size, for capacitors 20k and 31, was 21 mils by 21 mils. The driving signal 35 was 60 volts peak to peak at a frequency of 1000 cycles. All the diodes were silicon junction diodes, with the reverse saturation diode portion 32a of the double anode diode 32 having a 10 to 15 volt breakdown.

It is to be understood that the above-described arrangements are illustrative of the application of the principles of the invention. Numerous other arrangements may be devised by those skilled in the art without departing from the spirit and scope of the invention.

What is claimed is:

1. A push-button subscriber's key set including a first and a second line terminal, a plurality of ferroelectric capacitors each having different electrode areas, switch means for normally connecting each of said capacitors between said first and said second terminals, a transfer ferroelectric capacitor, the electrode area of said transfer capacitor being at least as large as the largest electrode area of said plurality of capacitors, means including said switch means for completely reversing the remanent polarization of any selected one of said plurality of capacitors through said transfer capacitor, and means connected between said first and said second terminals for controlling the switching of said transfer capacitor in discrete steps, said last-mentioned means including a ferroelectric capacitor having an electrode area at least as small as the smallest electrode area of said plurality of capacitors.

2. A signaling circuit for selectively delivering digit-indicating pulses comprising a first and a second terminal, a plurality of ferroelectric capacitors having graduated electrode areas connected in parallel between said terminals, a distinct ferroelectric capacitor having an electrode area at least as large as the largest area of said plurality of capacitors and connected to one of said terminals, means for selectively connecting any of said plurality of capacitors in series with said distinct capacitor between said terminals, means for applying pulses to said terminals to effect switching of the state of polarization of said series connected capacitors, said one of said plurality of capacitors completely switching its state of polarization and said distinct capacitor partially switching its state of polarization, and means for causing said distinct capacitor to switch its state of polarization to its initial state in discrete steps.

3. A signaling circuit in accordance with claim 6 wherein said last-mentioned means comprises a charge-metering ferroelectric capacitor and means connecting said charge-metering capacitor in series with said distinct capacitor between said terminals for pulses of one polarity at said terminals and directly between said terminals for pulses of the opposite polarity at said terminals.

4. A pulse signaling circuit comprising a first and a second conductor, a plurality of ferroelectric capacitors connected between said first and said second conductors, means for applying a train of pulses to said first conductor, means for selectively controlling transmission of pulses from said pulse train to said second conductor, said last-mentioned means including switch means associated with certain of said ferroelectric capacitors and a transfer ferroelectric capacitor connected to said second conductor, a charge-metering ferroelectric capacitor connected to said first conductor and to said transfer capacitor for controlling the reversal of the remanent polarization of said transfer capacitor in discrete steps, and detecting means connected to said second conductor for delivering an output signal indicative of the number of said pulses transmitted through said second conductor.

5. A pulse signaling circuit comprising a first and a second terminal, a plurality of digit-indicating ferroelectric capacitors connected between said first and said second terminals, each of said digit-indicating capacitors having different electrode areas, means connected in circuit with said digit-indicating capacitors for providing a path for resetting said capacitors to their initial state of remanent polarization, a transfer ferroelectric capacitor connected to said second terminal and having an electrode area at least as large as the electrode area of the largest of said digit-indicating capacitors, switching means for reversing the total remanent polarization of selected ones of said digit-indicating capacitors through said transfer capacitor, a charge-metering ferroelectric capacitor for controlling the reversal of the remanent polarization of said transfer capacitor in discrete steps, said charge-metering capacitor having an electrode area comparable to the electrode area of the smallest of the digit-indicating capacitors, and means connected in circuit with said charge-metering capacitor for providing a path for resetting the state of remanent polarization of said charge-metering capacitor.

6. A pulse signaling circuit comprising a first conductor and a second conductor, a plurality of digit-indicating ferroelectric capacitors having different electrode areas connected in parallel between said first and said second conductors, means for applying a train of pulses to said first conductor, a transfer ferroelectric capacitor connected to said second conductor and having an electrode area at least as large as the electrode area of the largest of said digit-indicating capacitors, means responsive to a single pulse of said train of pulses for completely reversing the remanent polarization of a selected one of said digit-indicating capacitors through said transfer capacitor, said last-named means including switch means for connecting said selected one of said digit-indicating capacitors in series with said transfer capacitor between said first and said second conductors, and charge metering means connected to said transfer capacitor and responsive to said pulses of said train of pulses for applying a predetermined number of signal pulses to said second conductor.

7. A pulse signaling system in accordance with claim 6 wherein said charge metering means comprises a charge metering ferroelectric capacitor connected to said first conductor and to said transfer capacitor and responsive to said pulses of said train of pulses for controlling the reversal of the remanent polarization of said transfer capacitor in discrete steps, said charge metering capacitor having an electrode area comparable to the electrode area of the smallest of said digit-indicating capacitors, and a double anode reverse saturation diode connected between said charge metering capacitor and said second conductor.

References Cited in the file of this patent

UNITED STATES PATENTS

| | | |
|---|---|---|
| 2,282,916 | Wolf | May 12, 1942 |
| 2,463,708 | McCreary | Mar. 8, 1949 |
| 2,475,553 | McCreary | July 5, 1949 |
| 2,717,372 | Anderson | Sept. 6, 1955 |